Jan. 18, 1938.  P. H. DAVEY  2,106,086

POWER TAKE-OFF AND ASSOCIATED MECHANISM

Filed March 26, 1936

Inventor

Paul H. Davey

By Strauch + Hoffman

Attorneys

Patented Jan. 18, 1938

2,106,086

UNITED STATES PATENT OFFICE 2,106,086

POWER TAKE-OFF AND ASSOCIATED MECHANISM

Paul H. Davey, Kent, Ohio

Application March 26, 1936, Serial No. 71,018

6 Claims. (Cl. 180—53)

This invention relates generally to mechanisms employed in connection with power shafts to take off power for the operation of air compressors, welding generators and like power units, and more particularly to such mechanisms and the manner of mounting them in combination with drive shafts upon vehicles. This application is a continuation in part of my application Serial No. 702,993 entitled Power take-off and associated mechanism, filed on December 18, 1933 which has matured into United States Patent No. 2,051,784, issued August 18, 1936.

Prior mechanisms of this type have usually involved a support for the take-off device immediately upon the vehicle frame or chassis or on members attached thereto in a manner such that they become an integral part of the frame or chassis, a sliding gear construction in some cases being directly supported on a casing which amounts to a pillow block. In such constructions, the take-off unit is compelled to positively follow the truck frame or chassis in its weaving during road travel and as a result, the bearings and associated elements of the unit are subjected to undue stresses which materially decrease their life and increase the possibility of the unit becoming inoperative or breaking down at any time. Inasmuch as such units when employed in connection with automotive vehicles are generally used on remote jobs far from repair shops, it is evident that the dependability and long life thereof becomes an important factor in the overall efficiency of the vehicle and its attached unit or units.

My present invention, which is an improvement over the device disclosed in my Patent No. 2,014,797, issued September 17, 1935, overcomes this disadvantage of the prior art structures in that the drive shaft of the automotive vehicle which passes through the power take-off is substantially rigidly supported by the frame of the vehicle as is desirable, yet my improved take-off unit is mounted with the requisite flexibility to permit it to yield and accommodate itself to the weave of the vehicle frame during road travel and to the varying distortion of the vehicle frame under different loads. My improved take-off and its associated mechanism is also designed to transmit the full power available in the prime mover, and readily adjust itself when put into operation when the supporting vehicle is so positioned that the frame thereof is distorted from normal alignment. This self adjustment is accomplished by the provision of self-aligning supporting means in connection with the power take-off whereby any reasonable amount of weaving and warping of the truck frame may take place without damage to the unit or its supporting bearings, and by novel internal construction permitting an overall contraction and expansion of the unit. My improved power take-off unit thus becomes an essentially independent transmission unit capable of self adjustment to varying positions relative to the truck frame, and has the further advantage that it frees the power take-off from the necessity of exact alignment with the drive shaft of a truck on which it is mounted, which has been an ever-present problem in the previous designs of such units. In most prior devices wherein the transmission mechanisms are confined to a supporting case, the size and arrangement of gears therein must of necessity be confined within definite limits which seriously limit the power that can be transmitted thereby, whereas with the present invention a relatively wide latitude is afforded in such selections.

My present invention has a further advantage in that it affords a compact unit for association with the drive shaft of a truck or vehicle whereby the vehicle may be driven together with simultaneous operation of the power converting unit located thereon.

Accordingly, it is a major object of my invention to provide a novel power take-off means through which the full prime mover power may be efficiently transmitted, that may be readily installed on automotive vehicles now in use or built into such vehicles in the course of construction thereof in a manner such that it may be considered an essentially independent transmission unit that will stand up under the shock of road travel, and weaving and distortion of the vehicle frame for a period considerably in excess of the usual life of prior units.

A further object of my invention is to provide a novel power take-off device that is supported in connection with the drive shaft of a truck or like vehicle through an arrangement whereby the necessity for exact alignment with the drive shaft is eliminated and the take-off is maintained in a semi-floating state whereby it may accommodate itself to distortion and weaving of the truck frame without the application of undue and harmful stresses to the bearings of the take-off or their associated structure.

Still a further object of my invention is to provide novel supporting means in connection with a power take-off unit on a truck drive shaft and truck frame, the supporting means being of a design to support the take-off in a semi-floating relation while yet supporting and maintaining the drive shaft in the preferred substantially rigid relation, thus permitting the take-off to yield and accommodate itself to weaving and warping of the truck frame during road travel and under different loads.

A further object of my invention is the provision of a novel power take-off arranged to be mounted on the frame of a truck or similar vehicle, the mounting and the take-off being of novel character whereby the take-off is supported in a universal, self-aligning, semi-floating relation with respect to the supporting frame, the take-off being characterized by its ability to adjust itself with respect to length to thereby avoid undue strains set up due to changes in alignment.

A further object of my invention is to provide a novel power take-off particularly adapted for insertion in a power or drive shaft, the take-off comprising a split shaft with novel means to maintain the axes of the split portions in fixed relation to one another as by an arrangement with the adjacent ends of the split sections rotatably supported by each other at at least two points in telescopic relation and the spaced ends being supported in self-aligning bearing means mounted on a suitable base or bases whereby the take-off may adjust itself to changes in alignment of the base or bases in addition to adjusting itself with respect to relatively small changes in length occasioned by the changes in alignment while maintaining its contained mechanism in correct alignment to prevent the development of internal strains.

Another object of my invention is the provision of novel power take-off means in a novel combination with a power converting unit such as a compressor, generator or the like whereby the power converting unit and the take-off therefor may be so positioned with reference to the drive shaft and the frame that there is substantially no sacrifice of the original cargo space.

A further object is the provision of a novel power take-off device for use particularly in connection with trucks, embodying a selective clutch and gear mechanism whereby the power from the drive shaft may be optionally directed either to a power converting unit, to the driving wheels of the truck, or both, novel supporting means from the truck frame and drive shaft being provided whereby the power take-off may yield to align itself in accordance with weaving of the truck frame during road travel while the drive shaft is maintained in its desired position.

My invention has as a further object the provision of novel power take-off means in combination with a selective clutch and gear mechanism, adapted to transmit the full available power of the prime mover, the whole being of compact design and capable of insertion in a drive shaft, countershaft or the like and being designed to yield to the distortion and flexing of such a shaft without resulting harm to the take-off means or a reduction in its efficiency.

Another object of my invention is the provision of a novel power take-off means designed to be positioned adjacent driving and driven shafts and mounted thereon for relative movement in such manner that exact alignment need not be maintained therebetween for proper and efficient operation, novel self-aligning supporting means being provided in connection with the take-off to permit a requisite amount of displacement to accommodate distortion of the basic support.

A further object of my invention is to provide a power take-off of novel design for employment with a sectional or split drive shaft, a novel manner of connecting and supporting the adjacent shaft sections being utilized immediately adjacent the power take-off mounting whereby the reaction thereupon is taken by the split shaft with no consequent distortion by stresses that would tend to decrease the efficiency thereof or reduce its anti-friction characteristics.

Still a further object of my invention is to provide a novel manner of connecting sections of a split propeller shaft through properly lubricated anti-friction means whereby a power take-off may be mounted and driven thereon with no reduction in the power transmitting efficiency of the shaft as a result of the reaction of the power take-off, novel clutching elements being also provided between the propeller shaft and the power take-off at a point immediately adjacent the anti-friction means to further minimize the resultant reaction against the shaft.

A further object of my invention is the provision of a power take-off of novel design together with selective clutch and gear mechanism whereby the construction thereof and the supporting means therefor is such that a relatively wide latitude is afforded for choice in the size and arrangement of gears and the arrangement thereof with the clutching mechanism.

Still a further object of my invention is to provide a novel manner of mounting a power take-off on a truck now in use or during the manufacture thereof whereby existing elements of the frame are utilized to best advantage and the take-off is assured of a semi-floating relation thus affording its accommodation to weaving of the frame during road travel or distortion of the frame due to varying loads, the manner of mounting being relatively simple and inexpensive.

It is still a further object of my invention to provide a novel power take-off in combination with a drive shaft together with improved lubricating means whereby proper lubrication of all the moving parts and their bearings is assured with a resulting increase in life of the take-off.

With the above and other objects in view as will appear from the following description, reference is made to the accompanying drawing wherein.

Figure 1:
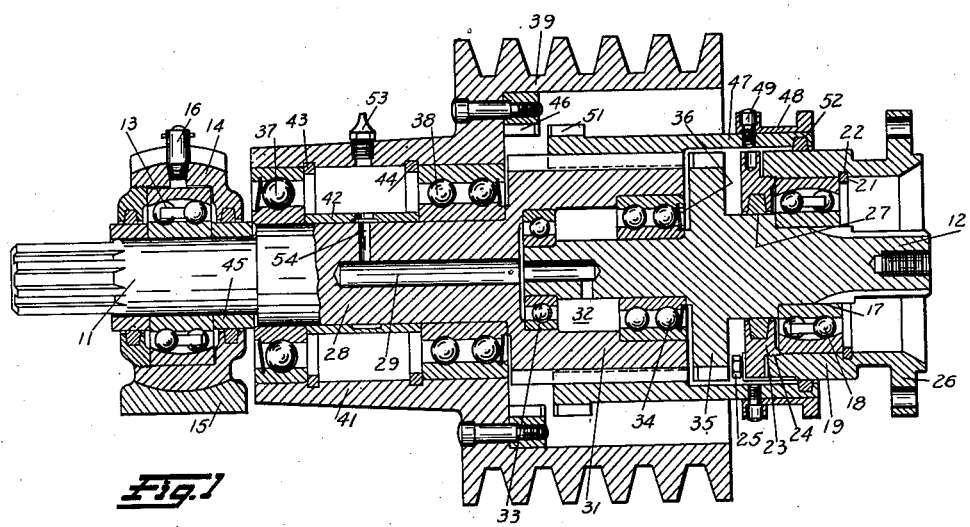
Figure 1 is a preferred embodiment of my invention shown in longitudinal diametric section.

With reference to Figure 1 of the drawing, there is illustrated therein a compact form of power take-off wherein the length is materially reduced, and the take-off may be inserted in a relatively short length of a drive shaft. A driving shaft 11 leading from a prime mover or other source of power is aligned with a driven shaft 12 leading to the driving wheels of the vehicle. Both shafts may be formed with splines at their end portions for suitable connection to other shafts through universal connections or the like. Shaft 11 is supported adjacent its left end in a self-aligning bearing 13 mounted in a bearing block 14 which in turn may be supported upon a pillow block 15 secured to the frame of the vehicle. Suitable lubrication is afforded through a grease fitting 16.

Shaft 12 is formed adjacent its right end with a portion 17 of reduced cross section about which is mounted a bearing 18 of the self-aligning type. A cylindrical annulus 19 is provided for the support of bearing 18, bearing 18 being maintained therein by a locking ring 21 fitting into a notch 22 in the inner surface of annulus 19 and a cover 23 fastened to the annulus as by a threaded connection 24. To insure the retaining of cover 23 in place against the rotation of shaft 12, a locking cap screw 25 may be passed through a hole in cover 23 to engage a threaded hole in annulus 19. Annulus 19 is formed with an annular flange 26 apertured for the reception of bolts, rivets or the like for connection to a rigid frame member (not shown). Means may be provided for the introduction of lubricant adjacent the splined end of shaft 12 and a lubricant retainer 27 is provided in cover 23. It will be noted that with both bearings 13 and 18, sufficient clearance in the supporting means is provided whereby shafts 11 and 12 may be angularly displaced with reference to their normal axes and not be cramped or locked thereagainst with resulting undesirable friction.

Shaft 11 is provided with a portion 28 of increased diameter having a hollow core 29 therein. A portion 31 of further increased diameter is provided with a hollow center 32 to form a cylindrical sleeve hereinafter designated as 31. Sleeve 31 is recessed in its interior to form bearing supports for bearings 33 and 34, preferably of the ball type. Shaft 12 terminates within and is mounted to rotate in bearings 33 and 34 in sleeve 31 and is formed with an integral gear 35 immediately adjacent bearing 34. A grease retainer 36 is preferably provided in bearing 34.

Shaft 11 has mounted thereon on its portion 28, bearings 37 and 38, preferably of the ball type, which support a pulley 39 having sleeve 41 or suitable gearing thereon to transmit power to a power converting unit usually located on the vehicle. A spacing collar 42 is provided in conjunction with locking elements 43 and 44 to space bearings 37 and 38, bearing 37 being otherwise held in place by a spacing collar 45 on shaft 11 and bearing 38 abutting against the end of sleeve 31. An annulus 46 with a gear thereon is bolted or otherwise secured to pulley 39 as shown. Sleeve 31 is splined on its outer surface to engage with corresponding interior splines on a sliding sleeve 47 provided with a notched collar 48 adjacent the right end thereof and adapted to be engaged by suitable operating means such as a fork (not shown). Collar 48 is preferably secured to sleeve 47 by cap screws 49. Sleeve 47 is formed at its left end with a gear 51 of a size to engage gear 46 and is further provided with a grease retainer 52 arranged to contact annulus 19.

In the position of sleeve 47 shown in Fig. 1, the unit is in neutral position with no drive to either shaft 12 or pulley 39. If it is desired to drive shaft 12 from shaft 11, sleeve 47 is shifted to the right until the interior splines thereon engage gear 35, the teeth of which are formed to fit the splines. Drive will then be through shaft 11, sleeve 31, sleeve 47, and gear 35 to shaft 12. If it is desired to drive pulley 39 from shaft 11, sleeve 47 is shifted to the left whereby gear 51 engages gear 46 and drive takes place through shaft 11, sleeve 31, sleeve 47, gear 51 and gear 46 to pulley 39.

Lubrication for the entire unit aside from the self-aligning bearings at the ends thereof is enabled by means of a single fitting 53 delivering lubricant into the space between the pulley and collar 42, whereby bearings 37 and 38 are lubricated. A conduit 54 leading to core 29 conducts lubricant to bearings 33 and 34.

Figure 2:
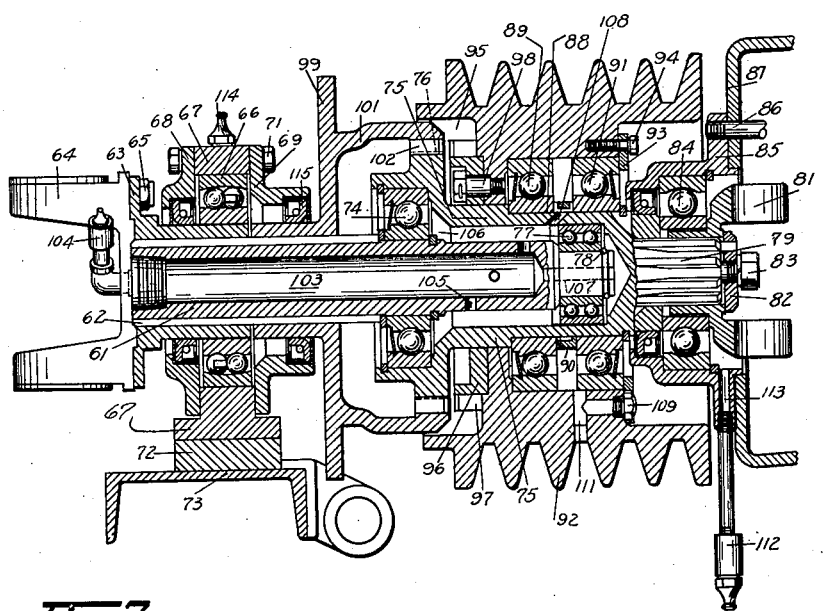
Figure 2 is a further preferred embodiment of my invention shown in longitudinal diametric section.

In Figure 2, I have illustrated a further preferred embodiment of the present invention wherein the overall assembly is even more compact than the assembly shown in Figure 1.

As shown in Figure 2, a driving shaft 61 having a splined outer surface 62 is connected by a splined and flanged bushing 63 to a universal joint 64 by suitable bolts 65, universal joint 64 being driven from any suitable means such as the prime mover of an automotive vehicle.

Flanged bushing 63 is supported in turn by a self-aligning bearing 66, the bearing 66 being held in position by a bearing block 67 having side pieces 68 and 69 secured thereto by suitable bolts such as shown at 71. Bearing block 67 is supported in turn upon a pillow block 72 mounted upon a frame member 73 of the vehicle.

The splined portion of shaft 61 terminates at a bearing 74 mounted about the shaft, bearing 74 being arranged to mount a sleeve member 75 formed with a gear 76 thereon. Beyond bearing 74, shaft 61 comprises a portion of reduced diameter which is mounted to rotate within a bearing 77, the bearing being secured to the shaft by suitable means as through a snap or lock ring 78. The bearing 77 is arranged to rotatably mount a second portion of the sleeve 75. This arrangement it will be noted maintains sleeve 75 in substantially fixed axial alignment with shaft 61.

Sleeve 75 terminates in a solid splined portion 79 which is connected to an element 81 of a universal joint, the connection being secured by a suitable washer 82 and nut 83 threaded on a stud projecting from shaft portion 79. Universal joint 81 may be connected by suitable means to drive the wheels of the vehicle or to another power unit as desired. Shaft 79, which for the purpose of convenience is termed a driven shaft, is supported through a self-aligning bearing 84 about the outer surface of universal joint element 81 and within a flanged member 85 which is secured through bolts 86 to the frame of the supporting vehicle as shown at 87. It will be noted that through the use of the spacing washers and collars shown in the drawing, the bearings and associated elements are maintained in fixed position and are all united in a compact and rigid assembly.

Sleeve 75 is provided on its outer surface with a portion 88 of reduced diameter on which are mounted two bearings 89 and 91 spaced by a suitable collar 90. Bearings 89 and 91 rotatably support a power transmitting means such as a pulley 92 which is provided with suitable grooves for engagement with a driving belt (not shown) leading to a generator, compressor or the like. Pulley 92 is maintained in position on bearings 89 and 91 by engagement of bearing 89 with a wall of the recessed portion of the pulley, and engagement of the bearing 91 with the collar 93 secured to pulley 92 by suitable bolts as shown at 94.

Pulley 92 is recessed as shown at 95 to define an annular space. Within this annular space a collar 96 having a gear 97 thereon is suitably secured to the pulley as by bolts 98 as shown. Thus far it will be noted that both the gears 76 and 97 are substantially positioned within the annular space 95.

A manually reciprocable member 99 having a bore splined to match the splines of shaft 61 is provided to slide on said shaft and to be driven thereby. Member 99 which may be termed a clutch member, is formed with a projecting flange 101 having a gear 102 on the outer end thereof. As will be seen from the drawing, the gear 102 is arranged to mesh with either gear 76 or gear 97. With the clutch element 99 in the position shown in Figure 2, drive through the power take-off shown will be through the universal 64, flanged bushing 63, shaft 61, clutch element 99, gear 102, sleeve 75, shaft 79 and universal element 81.

With the clutch element 99 shifted to the right so that gear 102 engages gear 97, the chain of drive will be universal 64, flanged bushing 63, shaft 61, clutch element 99, gear 102, gear 97, and pulley 92. If desired, the gear 102 may be made of a width so that gears 76 and 97 may be engaged at the same time whereby both the shaft 79 and the pulley 92 may be driven simultaneously.

It will be noted that in the structure shown in Figure 2, that aside from the self-aligning bearing structure shown to the left of the figure, the remaining structure including all the remaining bearings is mounted substantially within the dimensions of the driving pulley. This includes the bearings 74 and 77 which maintain the shafts 61 and 79 in alignment, the self-aligning bearing at the right of the figure which rotatably supports the power take off from the frame member 87 and the bearings 89 and 91 which support the power transmitting means or pulley 92. It will be noted that all the clutch elements both on the driven shaft, the driving shaft and the power transmitting means are located within the dimensions of the power transmitting means or pulley 92.

It will be seen that the invention as disclosed in Figure 2 involves a compact, practical power take-off structure which is particularly adapted for installation on vehicles where a minimum space is available.

For the lubrication of the embodiment illustrated in Figure 2, a hollow bore 103 is formed in shaft 61, the bore connecting with a suitable lubricant fitting 104 as shown. Adjacent the opposite end of the bore 103, apertures 105 are provided for the distribution of grease or lubricant to bearing 77, the inner bore of the sleeve 75 being provided with openings or passages 106 for the passage of lubricant to bearings 74. A lubricant passage 107 is provided in the end of shaft 61 to permit the passage of lubricant to the right side of bearing 77. An aperture 108 is provided leading from the space between shaft 61 and sleeve 75 to afford lubrication of bearings 89 and 91, lubrication of these bearings also being facilitated by a release fitting 109 connected with a passage 111. The purpose of this fitting is to relieve air pressures which would otherwise be built up by the filling of the lubrication spaces from a single grease fitting. Such a fitting is preferably designed to open when the pressure reaches approximately eighty pounds per square inch, thereby permitting of the complete filling of the chamber with grease, but at the same time insuring that the grease will be retained after it is once in place.

For lubrication of the bearing 84 and associated mechanism, a lubricant fitting 112 connecting with a passage 113 and member 85 is provided as shown at the right hand end of Fig. 2. Bearing 68 is lubricated through a fitting 114.

It will be noted that all the bearings are provided with means to prevent the escape of lubricant therefrom and that suitable lubricant seals of conventional type as shown at 115 are provided to prevent the escape of lubricant between the rotating elements.

The above described embodiments are not only comparatively simple in construction but also are characterized by increased efficiency and the transmission of power is accomplished with a minimum of intermediate agencies. Moreover, the entire assembly is so mounted by reason of the self-aligning bearings that they may readily accommodate themselves to distortion of the vehicle frame and no cramping or destruction of the supporting bearings will result.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A power take-off arranged to form a part of a drive shaft in an automotive vehicle comprising aligned driving and driven shaft sections, at least one of said sections being rotatably supported from said vehicle through a self-aligning bearing whereby the power take-off is maintained in self-aligned relation thereto; a power transmitting element rotatably supported on said driving section and spaced therefrom a substantial portion of its length to form an annular space adjacent the end of said driving section; double acting clutch means mounted on said driving section in non-rotatable relation thereto and within said annular space; cooperating clutch elements on said clutch means and said power transmitting element arranged to engage in one position of said clutch means; and cooperating clutch elements on said clutch means and said driven section arranged to engage in another position of said clutch means.

2. In a power take-off unit arranged to be inserted in a drive shaft on a vehicle; a split shaft, one shaft section of said split shaft being arranged to receive power from the drive shaft; a second shaft section arranged to be driven from said first section; spaced supporting means adjacent the outer ends of said shaft sections and attached to said vehicle, said supporting means being subject to stresses under working conditions effecting distortion and misalignment of the elements thereof and of the associated elements of said vehicle and comprising means to support said power take-off unit in universal relation to said vehicle to insure proper operation of said unit when placed under distortion and misalignment effected by stresses; power transmitting means rotatably mounted on one of said shaft sections and spaced therefrom a portion of its length to form an annular space around said shaft section; clutching means on said shaft sections and said power transmitting means whereby said power transmitting means or said second shaft section may be driven from said first shaft section, said means being located in said annular space; and mechanical means between said supporting means to maintain the axes of said shaft sections in fixed relation to one another including spaced bearing means.

3. In a power take-off unit arranged to be inserted in a drive shaft on a vehicle; a split shaft, one shaft section of said split shaft being arranged to receive power from the drive shaft; a second shaft section arranged to be driven from said first shaft section; spaced supporting means adjacent the outer ends of said shaft sections and attached to said vehicle, said supporting means being subject to stresses under working conditions effecting distortion and misalignment of the elements thereof and of the associated elements of said vehicle and comprising means to support said power take-off unit in universal relation to said vehicle to insure proper operation of said unit when placed under distortion and misalignment effected by stresses; power transmitting means mounted on said second shaft section and spaced therefrom a portion of its length to form an annular space around said second shaft section; clutching means on said sections and said power transmitting means whereby said power transmitting means or said second shaft section may be driven from said first shaft section, said means being located substantially in said annular space; and mechanical means between said supporting means to maintain the axes of said shaft sections in fixed relation to one another including spaced bearing means.

4. In a power take-off unit arranged to be inserted in a drive shaft on a vehicle; a split shaft, one shaft section of said split shaft being arranged to receive power from the drive shaft; a second shaft section arranged to be driven from said first shaft section; spaced supporting means adjacent the outer ends of said sections and attached to said vehicle, said supporting means being subject to stresses under working conditions effecting distortion and misalignment of the elements thereof and of the associated elements of said vehicle and comprising means to support said power take-off unit in universal relation to said vehicle to insure proper operation of said unit when placed under distortion and misalignment effected by stresses; power transmitting means mounted on said first shaft section and spaced therefrom a portion of its length to form an annular space around said first shaft section; clutching means on said sections and said power transmitting means whereby said power transmitting means or said second shaft section may be driven from said first shaft section, said means being located in said annular space; and mechanical means between said supporting means to maintain the axes of said shaft sections in fixed relation to one another including spaced bearing means.

5. A power take-off arranged to form a part of a drive shaft in an automotive vehicle comprising aligned driving and driven shaft sections, at least one of said sections being rotatably supported from said vehicle through a self-aligning bearing whereby said power take-off is maintained in self-aligned relation thereto; a power transmitting element rotatably supported on said driven section and spaced therefrom a substantial portion of its length to form an annular space adjacent the end of said driven section; double acting clutch means mounted on said driving section in non-rotatable relation thereto and within said annular space; and cooperating clutch elements on said clutch means, said power transmitting element and said driven section arranged to connect said clutch means and power transmitting element in one position and said clutch means and said driven section in another position.

6. A power take-off arranged to form a part of a drive shaft in an automotive vehicle comprising aligned driving and driven shaft sections, at least one of said sections being rotatably supported from said vehicle through a self-aligning bearing whereby the power take-off is maintained in self-aligned relation thereto; a power transmitting element rotatably supported on one of said sections and spaced therefrom a substantial portion of its length to form an annular space adjacent the end of said section; double acting clutch means mounted on said driving section in non-rotatable relation thereto and within said annular space; and cooperating clutch elements on said clutch means, said power transmitting element and said driven section arranged to connect said clutch means and said power transmitting element in one position of said clutch means and to connect said clutch means and said driven section in another position of said clutch means.

PAUL H. DAVEY.